(12) United States Patent
Jackson et al.

(10) Patent No.: US 11,697,622 B2
(45) Date of Patent: Jul. 11, 2023

(54) BARRIER COATING WITH CALCIUM ALUMINOSILICATE ADDITIVE

(71) Applicant: United Technologies Corporation, Farmington, CT (US)

(72) Inventors: Richard Wesley Jackson, Mystic, CT (US); Xia Tang, West Hartford, CT (US); Paul Sheedy, Bolton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 979 days.

(21) Appl. No.: 16/562,103

(22) Filed: Sep. 5, 2019

(65) Prior Publication Data

US 2021/0070666 A1    Mar. 11, 2021

(51) Int. Cl.
| | |
|---|---|
| *C04B 41/50* | (2006.01) |
| *C04B 41/00* | (2006.01) |
| *C04B 41/45* | (2006.01) |
| *C04B 41/52* | (2006.01) |
| *F01D 5/28* | (2006.01) |

(52) U.S. Cl.
CPC ........ *C04B 41/5024* (2013.01); *C04B 41/009* (2013.01); *C04B 41/4523* (2013.01); *C04B 41/52* (2013.01); *F01D 5/288* (2013.01); *C04B 2235/3208* (2013.01); *C04B 2235/3217* (2013.01); *C04B 2235/3418* (2013.01); *C04B 2235/3481* (2013.01); *C04B 2235/5244* (2013.01); *C04B 2235/5436* (2013.01); *C04B 2235/96* (2013.01); *F05D 2220/32* (2013.01); *F05D 2300/6033* (2013.01)

(58) Field of Classification Search
None
See application file for complete search history.

(56) References Cited

U.S. PATENT DOCUMENTS

| | | | |
|---|---|---|---|
| 8,859,052 B2 | 10/2014 | Kirby et al. | |
| 2010/0159150 A1* | 6/2010 | Kirby | .............. C04B 41/009 427/419.7 |
| 2010/0255260 A1* | 10/2010 | Lee | ..................... C04B 41/52 428/164 |
| 2013/0189531 A1* | 7/2013 | Lee | ..................... C09D 5/18 428/448 |
| 2014/0272467 A1* | 9/2014 | Schaeffer | ............. F01D 25/08 427/372.2 |
| 2016/0332922 A1 | 11/2016 | Tang | |
| 2018/0282851 A1* | 10/2018 | Ndamka | ............. C23C 28/321 |
| 2019/0071769 A1 | 3/2019 | Kirby et al. | |

OTHER PUBLICATIONS

Krämer er al., Thermochemical Interaction of Thermal Barrier Coatings with Molten CaO-MgO-Al2O3-SiO2 (CMAS) Deposits, J. Am. Ceram. Soc.,89[10] 3167-3175 (2006) (Year: 2006).*

(Continued)

*Primary Examiner* — Elizabeth Collister
(74) *Attorney, Agent, or Firm* — Carlson, Gaskey & Olds, P.C.

(57) ABSTRACT

A gas turbine engine article includes a substrate and a silicate-resistant barrier coating disposed on the substrate. The silicate-resistant barrier coating is composed of a refractory matrix and a calcium aluminosilicate additive (CAS additive) dispersed in the refractory matrix.

13 Claims, 6 Drawing Sheets

(56) References Cited

OTHER PUBLICATIONS

European Search Report for European Patent Application No. 20194577.1 completed Jan. 25, 2021.
Craig, M., Ndamka, N.L., Wellman, Jr., R.G., and Nicholls, J.R. (2015). CMAS degradation of EB-PVD TBCs: The effect of basicity. Surface & Coatings Technology vol. 270. pp. 145-153.
Turcer, L.R., Krause, A.R., Garces, H.F., Zhang, L., and Padture, N.P. (2018). Environmental-barrier coating ceramics for resistance against attack by molten calcia-magnesia-aluminosilicate (CMAS) glass: Part II, β-Yb2Si2O7 and β-Sc2Si2O7. Journal of the European Ceramic Society. vol. 38(11). pp. 3914-3924.

\* cited by examiner

BARRIER COATING WITH CALCIUM ALUMINOSILICATE ADDITIVE

BACKGROUND

Components in a gas turbine engine often include barrier coatings to protect the underlying component from the effects of the severe operating environment. Barrier coatings are available in numerous varieties, which can include thermal barrier coatings and environmental barrier coatings. Thermal barrier coatings are typically designed for maximizing thermal insulation of a component from the surrounding high-temperature environment. Environmental barrier coatings are typically designed for maximizing resistance of infiltration or attack by the environment.

SUMMARY

A gas turbine engine article according to an example of the present disclosure includes a substrate, and a silicate-resistant barrier coating disposed on the substrate. The silicate-resistant barrier coating is composed of a refractory matrix and a calcium aluminosilicate additive (CAS additive) dispersed in the refractory matrix.

In a further embodiment of any of the foregoing embodiments, the CAS additive includes, by mol. %, 30 to 90 of $SiO_2$.

In a further embodiment of any of the foregoing embodiments, the CAS additive includes, by mol. %, 5 to 30 of $AlO_{1.5}$.

In a further embodiment of any of the foregoing embodiments, the CAS additive includes, by mol. %, 10 to 50 of CaO.

In a further embodiment of any of the foregoing embodiments, the CAS additive includes, by mol. %, 30 to 90 of $SiO_2$, 5 to 30 of $AlO_{1.5}$, and 10 to 50 of CaO.

In a further embodiment of any of the foregoing embodiments, the CAS additive includes $X^1$ mol. % of $SiO_2$, $X^2$ mol. % of CaO, and $X^3$ mol. % of $AlO_{1.5}$, where $X^1$ is greater than $X^2$ and $X^1$ is greater than $X^3$.

In a further embodiment of any of the foregoing embodiments, $X^2$ is greater than $X^1$.

In a further embodiment of any of the foregoing embodiments, the CAS additive additionally includes, by mol. %, less than 10 of at least one of magnesium, barium, or strontium in the form of an oxide.

In a further embodiment of any of the foregoing embodiments, the refractory matrix is selected from zirconia, hafnia, hafnium silicate, zirconium silicate, rare earth silicate, rare earth oxides, mullite, aluminum oxide, or combinations thereof.

In a further embodiment of any of the foregoing embodiments, the refractory matrix is selected from zirconia, hafnia, or combinations thereof.

In a further embodiment of any of the foregoing embodiments, the refractory matrix is rare earth oxide.

In a further embodiment of any of the foregoing embodiments, the refractory matrix is rare earth silicate.

In a further embodiment of any of the foregoing embodiments, the refractory matrix is selected from hafnium silicate, zirconium silicate, or combinations thereof.

In a further embodiment of any of the foregoing embodiments, the silicate resistant barrier coating includes, by mol. %, 0.1 to 30 of the CAS additive.

In a further embodiment of any of the foregoing embodiments, the silicate resistant barrier coating includes 3 to 8 of the CAS additive.

A gas turbine engine article according to an example of the present disclosure includes a substrate, and a coating system disposed on the substrate. The coating system has a silicate-resistant barrier coating, and a silicate-containing deposit on the silicate-resistant barrier coating. The silicate-containing deposit is non-native to the coating system. The silicate-resistant barrier coating has a composition that is in equilibrium or near equilibrium with the silicate-containing deposit.

In a further embodiment of any of the foregoing embodiments, the silicate deposit is calcium-magnesium-aluminosilicate and the silicate-resistant barrier coating is composed of a refractory matrix and a calcium aluminosilicate additive (CAS additive) comprised of calcia, alumina, and silica and that is dispersed in the refractory matrix.

In a further embodiment of any of the foregoing embodiments, the calcia, alumina, and silica have respective chemical activities as defined in FIGS. 5A, 5B, and 5C.

A gas turbine engine article according to an example of the present disclosure includes a substrate formed of a ceramic matrix composite composed of silicon carbide fibers in a silicon carbide matrix, and a silicate-resistant barrier coating disposed on the substrate. The silicate-resistant barrier coating is formed of a composition of a refractory matrix selected from zirconia, hafnia, hafnium silicate, zirconium silicate, rare earth silicates, rare earth oxides, mullite, aluminum oxide, and combinations thereof and a calcium aluminosilicate additive (CAS additive) dispersed in the refractory matrix. The composition includes, by mole percent, 0.1 to 30 of the calcium aluminosilicate.

In a further embodiment of any of the foregoing embodiments, the silicate resistant barrier coating includes, by mol. %, 3 to 8 of the CAS additive.

In a further embodiment of any of the foregoing embodiments, the CAS additive includes $X^1$ mol. % of $SiO_2$, $X^2$ mol. % of CaO, and $X^3$ mol. % of $AlO_{1.5}$, where $X^1$ is greater than $X^2$ and $X^1$ is greater than $X^3$.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
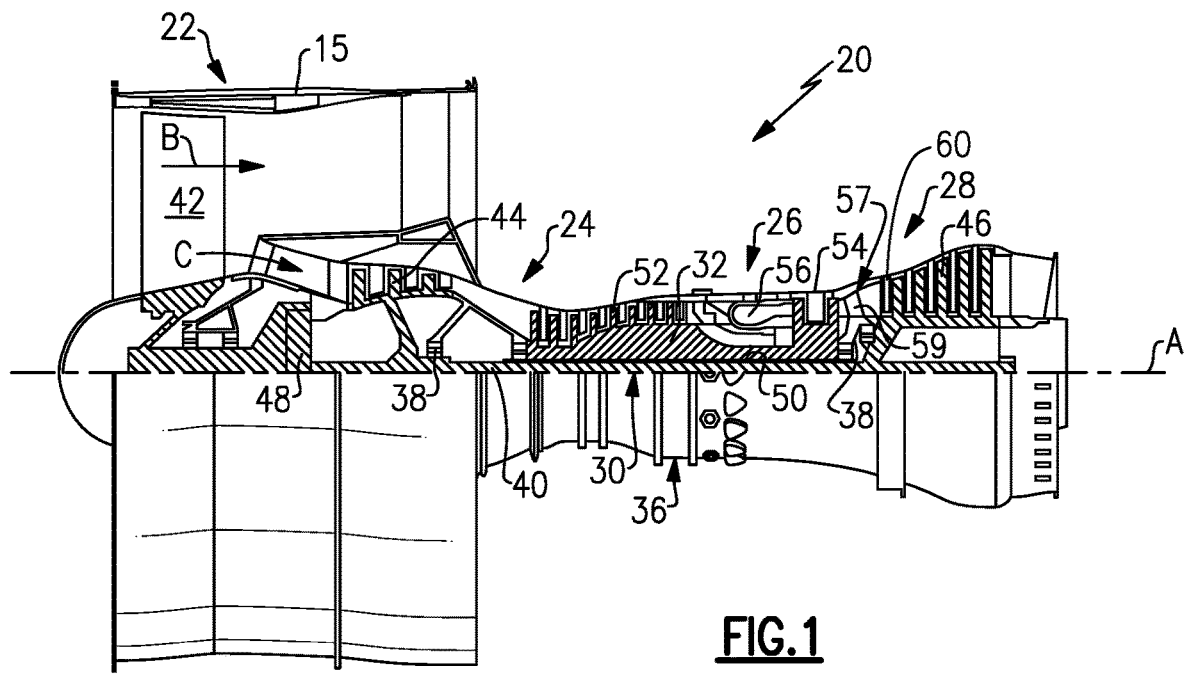
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
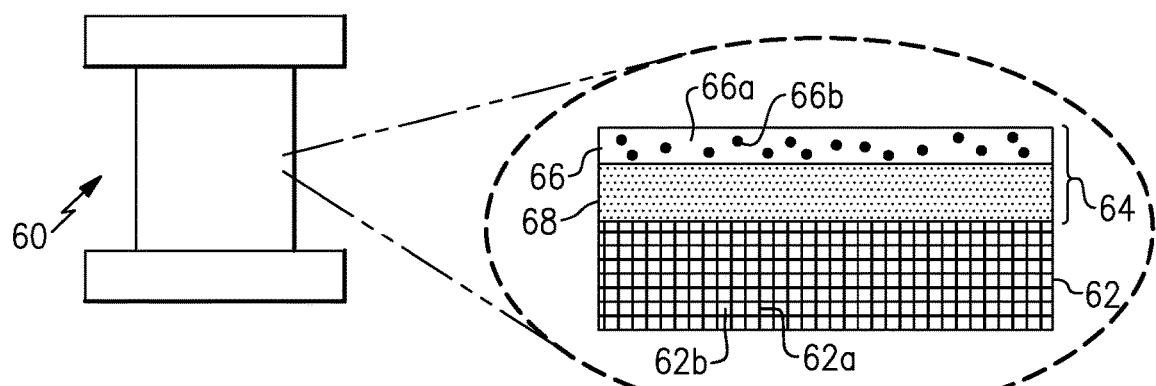
FIG. 2 illustrates an article of the engine and representative section of the article.

FIG. 2 illustrates an example article 60, with a representative section of the article 60 shown in the encircled inset. In the illustrated example, the article 60 is a turbine vane (see also FIG. 1). It is to be understood, however, that the article 60 is not limited to vanes and that although a vane is shown the examples herein are also applicable to blades, outer air seals, or other engine components, particularly those that are exposed to combustion gases.

The article 60 includes a substrate 62 and a coating system 64 disposed on the substrate 62. For example, the substrate 62 is formed of a ceramic, such as a silicon-containing ceramic. The ceramic may be a monolithic ceramic or a ceramic matrix composite ("CMC"). One example CMC is SiC/SiC in which SiC fibers (designated at 62a in FIG. 2) are disposed within a SiC matrix (designated at 62b in FIG. 2). For example, the substrate 62 is generally a self-supporting structure that defines the geometry of the article 60 or a portion thereof, as opposed to a conformal coating.

Engine components may be exposed to relatively severe temperatures and environmental conditions during operation. Such conditions can reduce the durability of ceramics, such as silicon-containing ceramics and silicon carbide. In particular, high velocity, high pressure water vapor in the combustion gases reacts with silicon-containing ceramics such as silicon carbide to form volatile species leading to recession of the substrate. As such, environmental barrier coatings (EBCs) are utilized to combat recession of silicon-containing ceramics. However, silicate-containing deposits, such as calcium-magnesium-aluminosilicate ("CMAS"), from dirt/debris can deposit on engine component surfaces. The silicate-containing deposits can be molten at times, and this viscous liquid can undesirably react with and wick into an environmental barrier coating and ultimately cause sintering, loss of compliance, and spallation. In this regard, as will be described further below, the coating system 64 serves as an environmental barrier coating that is designed to protect the underlying substrate 62 from steam recession and, in particular, resist infiltration of the silicate-containing deposits.

The coating system 64 at least includes a silicate-resistant barrier coating 66 ("coating 66"). As used herein, a "coating" refers to a continuous, relatively thin, substantially uniform thickness layer. The coating system 64 may be a single layer configuration with only the coating 66 but more typically will be a multi-layer configuration and include an intermediate bond coating 68 that is located between the coating 66 and the substrate 62. In a multi-layer configuration the coating 66 is a topcoat, i.e., the outermost, exposed coating.

The bond coating 68 may be a single layer or a multi-layer configuration and, in addition to bonding the coating 66 to the substrate 62, may be composed to serve as a thermal barrier, volatilization barrier, oxidation barrier, and/or mechanical stabilizer. Although not limited, in one example the bond coating 68 is composed of a silicon-containing matrix, such as a silica ($SiO_2$) matrix. In a further example, the bond coating 68 additionally includes silicon oxycarbide particles dispersed in the silicon-containing matrix. In yet a further example, the bond coating 68 further includes barium-magnesium aluminosilicate particles dispersed in the silicon-containing matrix.

The coating 66 resists infiltration of silicate-containing deposits, such as CMAS, and is composed of a refractory matrix 66a and a calcium aluminosilicate additive 66b ("CAS additive 66b") dispersed in the refractory matrix 66a. The CAS additive 66b may reside at grain boundaries in the refractory matrix 66a. For example, the refractory matrix is selected from zirconia ($ZrO_2$), hafnia ($HfO_2$), hafnium silicate, zirconium silicate, rare earth silicates, rare earth oxides, mullite, silica ($SiO_2$), aluminum oxide, or combinations thereof. Rare earth elements include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The zirconia may be a stabilized zirconia that has a rare earth oxide stabilizer, such as yttria (e.g., $Y_2O_3$—$ZrO_2$) or alkaline earth oxide stabilizer, such as calcia (e.g. CaO—$ZrO_2$). The rare earth silicate may be a rare earth monosilicate ($ReSiO_5$), a rare earth disilicate ($Re_2Si_2O_7$), or combinations thereof. The rare earth oxides may be of the form $Re_2O_3$, $ReO_2$, or other stoichiometry corresponding to the base rare earth element oxidation state. The hafnium silicate may be $Hf_{0.5}Si_{0.5}O_2$. The zirconium silicate may be $Zr_{0.5}Si_{0.5}O_2$.

In one example, the CAS additive 66b includes, by mol. %, 30 to 90 of $SiO_2$. The units of mol. % used herein refer to mole percentages of single cations of the given compound. In another example, the CAS additive 66b includes, by mol. %, 5 to 30 of $AlO_{1.5}$. In another example, the CAS additive 66b includes, by mol. %, 10 to 50 of CaO. In an additional example, the CAS additive 66b includes, by mol. %, 30 to 90 of $SiO_2$, 5 to 30 of $AlO_{1.5}$, and 10 to 50 of CaO. As will be described below in the processing methodology, one or more of the constituents may be incorporated via a binder, such as colloidal silica.

In another example, where $X^1$, $X^2$, and $X^3$ are variables that sum to 100, the CAS additive 66b includes $X^1$ mol. % of $SiO_2$, $X^2$ mol. % of CaO, and $X^3$ mol. % of $AlO_{1.5}$, where $X^1$ is greater than $X^2$ and $X^1$ is greater than $X^3$. In a further example, $X^2$ is greater than $X^1$. In an additional example, the combined amount of $X^1$ and $X^3$ is at least 50 and is no more than 90. In yet a further example, the combined amount of $X^1$ and $X^3$ is at least 70 and is no more than 90. In an additional example, the combined amount of $X^2$ and $X^3$ is less than $X^1$.

Table 1 below demonstrates additional example compositions of the CAS additive 66b, designated as CAS-A, CAS-B, CAS-C, CAS-D, and CAS-E. In further examples, the mol. % of each constituent of CAS-A, CAS-B, CAS-C, CAS-D, and CAS-E given in Table 1 varies by +/−5.

TABLE 1

CAS Additive Compositions

| | Constituent | mol. % |
|---|---|---|
| CAS-A | CaO | 15 |
| | $AlO_{1.5}$ | 10 |
| | $SiO_2$ | 75 |
| CAS-B | CaO | 26 |
| | $AlO_{1.5}$ | 11 |
| | $SiO_2$ | 63 |
| CAS-C | CaO | 27 |
| | $AlO_{1.5}$ | 13 |
| | $SiO_2$ | 60 |
| CAS-D | CaO | 43 |
| | $AlO_{1.5}$ | 14 |
| | $SiO_2$ | 43 |
| CAS-E | CaO | 28 |
| | $AlO_{1.5}$ | 27 |
| | $SiO_2$ | 45 |

Further examples of the CAS additive 66b additionally include magnesium, barium, or strontium, such as magnesium oxide (MgO), barium oxide (BaO), or strontium oxide (SrO). The following examples are based on MgO, but may also apply to BaO, SrO, or mixtures of two or more of MgO, BaO, and SrO. For example, where $X^1$, $X^2$, $X^3$, and $X^4$ are variables that sum to 100, the CAS additive 66b includes $X^1$ mol. % of $SiO_2$, $X^2$ mol. % of CaO, $X^3$ mol. % of $AlO_{1.5}$, and $X^4$ mol. % of MgO, where $X^4$ is less than $X^2$. In another example, $X^4$ is also less than $X^3$. In a further example, $X^4$ is also less than $X^1$. In additional examples, $X^4$ is less than 10.

Table 2 below demonstrates additional example compositions of the CAS additive 66b that include MgO (i.e. CMAS), designated as CMAS-A, CMAS-B, CMAS-C, CMAS-D, and CMAS-E. In further examples, the mol. % of each constituent given in Table 2 varies by +/−5, except that the MgO varies by +/−2.

TABLE 2

CAS Additive Compositions With Magnesium

|  | Constituent | Mol. % |
|---|---|---|
| CMAS-A | CaO | 14 |
|  | $AlO_{1.5}$ | 10 |
|  | $SiO_2$ | 71 |
|  | MgO | 5 |
| CMAS-B | CaO | 25 |
|  | $AlO_{1.5}$ | 10 |
|  | $SiO_2$ | 60 |
|  | MgO | 5 |
| CMAS-C | CaO | 26 |
|  | $AlO_{1.5}$ | 11 |
|  | $SiO_2$ | 58 |
|  | MgO | 5 |
| CMAS-D | CaO | 38 |
|  | $AlO_{1.5}$ | 14 |
|  | $SiO_2$ | 43 |
|  | MgO | 5 |
| CMAS-E | CaO | 27 |
|  | $AlO_{1.5}$ | 26 |
|  | $SiO_2$ | 42 |
|  | MgO | 5 |

The coating 66 generally includes a minority amount (substantially less than 50 mol. %) of the CAS additive 66b, with the remainder being the refractory matrix 66a. For example, the coating 66 includes, by mol. %, 0.1 to 30 of the CAS additive 66b. In a more particular example, the coating 66 includes 3 to 8 of the CAS additive 66b. Table 3 below demonstrates additional example compositions of the coating 66, designated as Composition-1, Composition-2, and Composition-3. For example, the CAS additive listed for each of Composition-1, Composition-2, and Composition-3 can be the compositions of CAS-A, CAS-B, CAS-C, or CAS-D above. In further examples, the mol. % of each constituent of Composition-1, Composition-2, and Composition-3 given in Table 3 varies by +/−3.

TABLE 3

Silicate-Resistant Barrier Coating Compositions

|  | Constituent | mol. % |
|---|---|---|
| Composition-1 | $HfO_2$ | 0 |
|  | $Hf_{0.5}Si_{0.5}O_2$ | 95 |
|  | CAS Additive | 5 |
| Composition-2 | $HfO_2$ | 75 |
|  | $Hf_{0.5}Si_{0.5}O_2$ | 20 |
|  | CAS Additive | 5 |
| Composition-3 | $HfO_2$ | 95 |
|  | $Hf_{0.5}Si_{0.5}O_2$ | 0 |
|  | CAS Additive | 5 |

Figure 3:
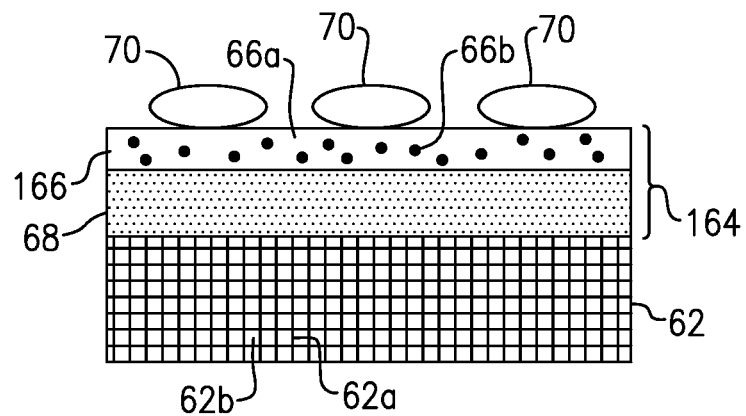
FIG. 3 illustrates another example representative section.

FIG. 3 illustrates another example coating system 164. In this disclosure, like reference numerals designate like elements where appropriate and reference numerals with the addition of one-hundred or multiples thereof designate corresponding modified elements. The coating system 164 at least includes a silicate-resistant barrier coating 166 ("coating 166"). Like the coating system 64, the coating system 164 may be a single layer configuration or a multi-layer configuration with the bond coating 68.

There is also a silicate-containing deposit 70 ("deposit 70") on, and in contact with, the coating 166. The deposit 70 is non-native to the coating system 164. The term "non-native" refers to the source of the deposit 70 being from other than the coating system 164. For instance, the coating system 164 is an engineered system, whereas the deposit 70 is non-engineered and may occur from the environment of the article 60 during operation or testing (e.g., from dirt/debris carried in the core gas path and combustion gases) or from artificial placement of the deposit 70 for testing/evaluation purposes. For example, the deposit 70 is CMAS.

The coating 166 has a composition that approaches chemical equilibrium with the deposit 70 with respect to the chemical activity of the constituent within the coating 166 and deposit 70. The chemical activity, represents the thermodynamic potential of the each constituent within a mixture with respect to the thermodynamic potential of the pure constituent. Activity is a dimensionless quantity that is the ratio of the vapor pressure in equilibrium with a pure material, to the vapor pressure in equilibrium with a mixture. Without being bound by a particular theory, the thermodynamic driving force for a species within a substance to migrate into an adjacent substance is proportional to the difference in chemical activity between the two substances. In terms of the coating 166 being equilibrated with the deposit 70, this means that the chemical activity of the constituent in deposit 70 are not substantially different from the chemical activity of the constituent of the coating 166. As a result of being in a state of near equilibrium there is minimal thermodynamic driving force for the deposit 70 to react with or diffuse into the coating 166. In contrast, if the coating 166 were not equilibrated, there would be a thermodynamic driving force for the deposit 70 to react with or diffuse into the coating 166.

In an example, the deposit 70 is CMAS and the coating 166 is composed of the refractory matrix 66a and the CAS additive 66b dispersed in the refractory matrix 66a. For instance, the compositions of the refractory matrix 66a and the CAS additive 66b are selected from the compositions as disclosed above to be equilibrated with the CMAS.

In further examples, the composition or expected composition of the deposit 70 may vary. For instance, the engine may be exposed to different compositions of dirt/debris, depending on which region of the Earth the engine is operating in. A target composition of the deposit 70 can be identified, such as by estimation from known data, by experiment from collection of samples from engines in service, and/or by literature. Once a target composition of the deposit 70 is identified, a composition of the coating 166 that is equilibrated with the target composition of the deposit 70 can be selected from among the compositions disclosed herein. The following working example demonstrates further aspects of such an approach.

Figure 4:
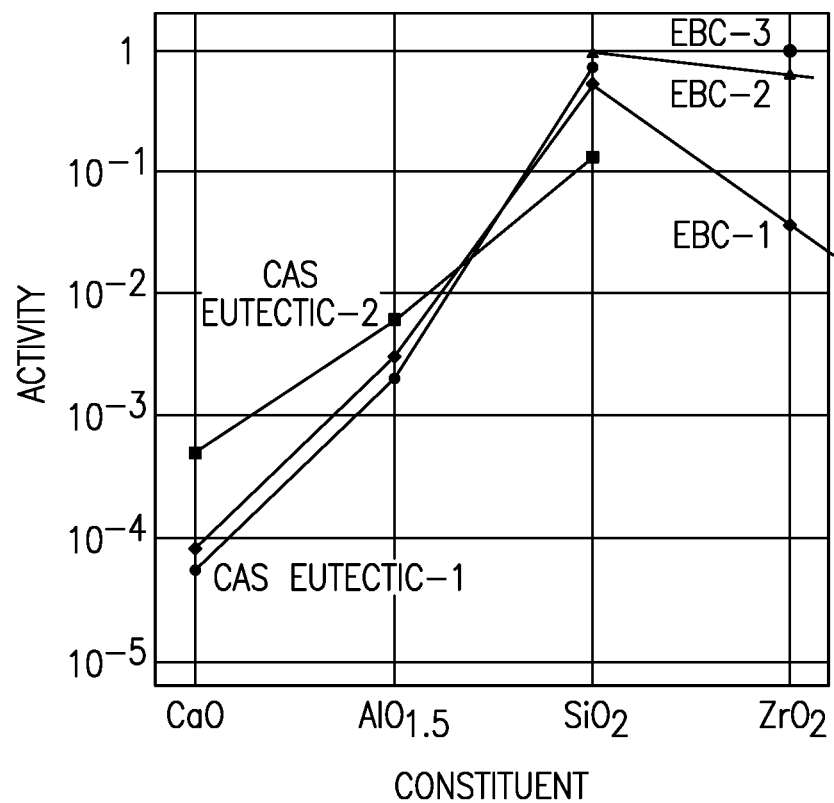
FIG. 4 illustrates a graph that shows the chemical activity of constituents of an EBC and two CAS Eutectic compositions.

As an example, the chemical activity of coatings 166 and deposits 70 are calculated (e.g., using the thermodynamic database FactSage). To represent the chemistry of typical deposits 70, two compositions were chosen that correspond to the two lowest congruent melting points in the calcia-alumina-silica system and are labeled CAS Eutectic-1 and CAS Eutectic-2 in Table 4 below. A coating 166 with an "equilibrated chemistry" is denoted EBC-1 and two coatings with non-equilibrated chemistry are denoted EBC-2 and EBC-3. The graph in FIG. 4 shows the activity of the constituent of EBC-1 are similar to CAS Eutectic-1 and CAS Eutectic-2. Conversely, EBC-2 and EBC-3 do not have the similarity in chemical activity due to the absence of CaO, $AlO_{1.5}$.

TABLE 4

CAS and EBC compositions

| | Constituent | mol. % |
|---|---|---|
| EBC1 | ZrO2 | 75 |
| | Zr0.5Si0.5O2 | 20 |
| | CAS-C | 5 |
| EBC-2 | Zr0.5Si0.5O2 | 100 |
| EBC-3 | ZrO2 | 100 |
| CAS | CaO | 26 |
| Eutectic-1 | AlO1.5 | 15 |
| | SiO2 | 59 |
| CAS | CaO | 39 |
| Eutectic-2 | AlO1.5 | 20 |
| | SiO2 | 41 |

Figure 5A:
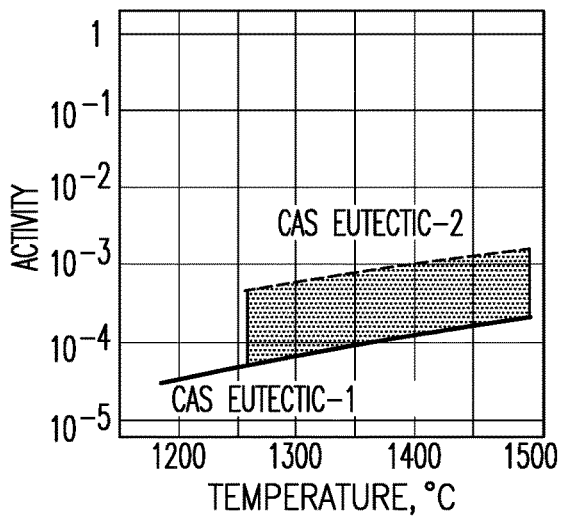
FIG. 5A illustrates a graph showing a range of activities of CaO as a function of temperature for the two lowest melting eutectic compositions in the CaO—$AlO_{1.5}$—$SiO_2$ system.
Figure 5B:
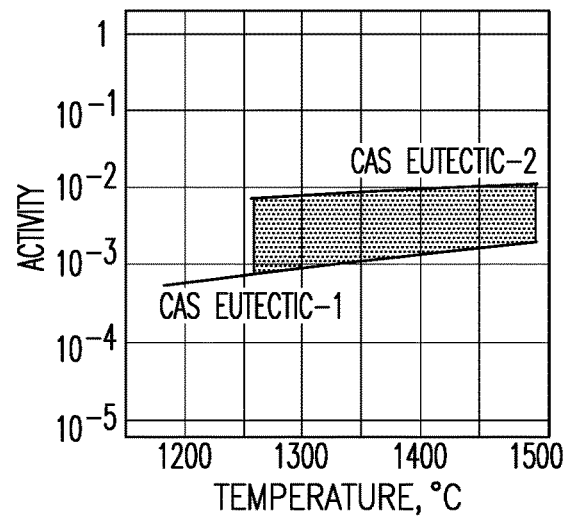
FIG. 5B illustrates a graph showing a range of activities of $AlO_{1.5}$ as a function of temperature for the two lowest melting eutectic compositions in the CaO—$AlO_{1.5}$—$SiO_2$ system.
Figure 5C:
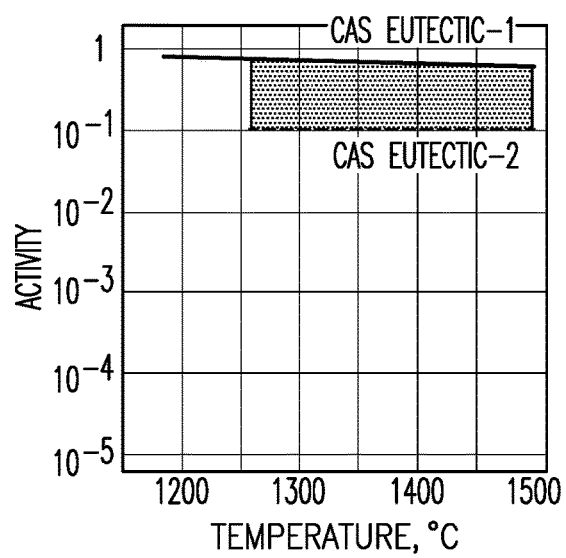
FIG. 5C illustrates a graph showing a range of activities of $SiO_2$ as a function of temperature for the two lowest melting eutectic compositions in the CaO—$AlO_{1.5}$—$SiO_2$ system.

The equilibrium or near equilibrium between the coating 166 and the deposit 70 can be further described in terms of the activity of the constituents in the coating 166 falling within the range of activities of one or more constituents in the deposit 70. For example, for constituents of interest, such as CaO, $AlO_{1.5}$, and $SiO_2$, a range of activities in deposits are identified, and then the constituents present with in the coating 166 are selected to be within that range. As an example, the three primary constituents of engine deposits are calcia, alumina, and silica. From these, a range is established based on the lowest melting eutectic compositions for the constituents of interest. This is represented below in the graphs in FIGS. 5A, 5B, and 5C for, respectively, calcia, alumina, and silica. FIG. 5A is the activity of CaO, FIG. 5B is the activity of $AlO_{1.5}$, and FIG. 5C is the activity of $SiO_2$, each as a function of temperature for the two lowest melting eutectic compositions in the CaO—$AlO_{1.5}$—$SiO_2$ system. The shaded regions represent the target range of CAS activities in the coating 166. The lowest eutectic has a composition, by mol. %, of 25.8 CaO, 15.2 $Al_2O_5$, and 59.0 $SiO_2$. The second lowest eutectice has a composition, by mol. %, of 39.3 CaO, 20.1 $Al_2O_5$, and 40.6 $SiO_2$). The "band" of activity between the two eutectics thus becomes the target activity and the corresponding constituent, calcia, alumina, or silica, is selected within the coating 166 in an amount that corresponds to an activity that falls within that activity band. In further examples, if aluminum diffusion into a coating 166 does not have as deleterious an effect as calcium would, the chemical potential of calcium in the coating 166 can be designed to be equilibrated with calcium in the deposit 70. That is, the chemical potentials of one or more constituents in the coating 166 is designed to be equilibrated with one or more target species in the deposit 70.

The coating systems 64/164 disclosed herein may be fabricated using techniques such as, but not limited to, spray drying, sintering, plasma spraying, slurry deposition, and combinations of various techniques.

Figure 6:
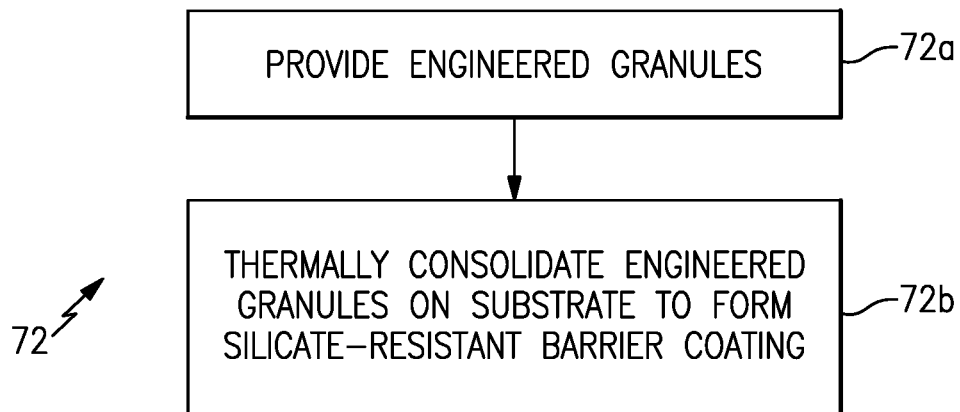
FIG. 6 illustrates a method of fabricating a silicate-resistant barrier coating.

FIG. 6 illustrates a coating fabrication method 72 that can be used to produce the coating 66/166 with an engineered microstructure. The method 72 generally includes steps 72a and 72b. At step 72a engineered granules are provided. The engineered granules will be discussed in further detail below, but each engineered granule is an aggregate of at least one refractory matrix region and at least one calcium aluminosilicate additive region (CAS additive region) attached with the at least one refractory matrix region. Ultimately, the refractory matrix region(s) of the granules will form at least a portion of the refractory matrix 66a in the coating 66/166 and the CAS additive region(s) of the granules will form the CAS additive 66b in the coating 66/166.

At step 72b the engineered granules are thermally consolidated on the substrate 62 to form the coating 66/166 with the engineered microstructure. In the thermal consolidation the refractory matrix region(s) from the engineered granules form grains of the refractory matrix 66a and the CAS additive region(s) from the engineered granules form the CAS additives 66b which are dispersed between the refractory matrix grains. The term "thermal consolidation" or variations thereof refers to a process by which the constituents of a coating are joined together to form the coating. In one example, the thermal consolidation is by a thermal spray process. The method 72 may further include a heat treatment of the as-deposited coating. For instance, the heat treatment may facilitate transport of the CAS additive 66b to the grain boundaries described below, as well as into any porosity of the coating.

The following is a non-limiting working example of a thermal spray process that may be used. The engineered granules are deposited onto a substrate that is located about 4 inches from a plasma spray gun nozzle. The granules are fed through a thermal spray system at a rate of 2-3 lbs/hr using an argon carrier gas. The granules are introduced into a 42 kW argon/hydrogen plasma and deposited onto the substrate at a surface speed of 30 ft/min. The granules sufficiently soften or melt to form the coating 66/166.

In another example, the thermal consolidation is by a slurry coating and sintering process. For instance, the engineered granules are first provided to the substrate via an aqueous or non-aqueous slurry containing about 10 to 50 vol % of the granules. The slurry may contain an organic binder, inorganic binder, dispersants or other modifiers such as plasticizers. The slurry is coated on the substrate by one of slip casting, spin coating, slurry spraying, tape casting, aerosol jet spraying or other suitable method. The slurry coating is dried and thermally treated to a temperature sufficient to form the coating 66/166. The thermal treatment may comprise firing in a high temperature furnace and may include a binder burnout step, a pre-sintering step. The furnace thermal treatment may be conducted in air, inert, or reactive atmospheres, or vacuum, at temperatures up to 1500° C. or higher, depending on the thermal stability of the substrate.

Figure 7:
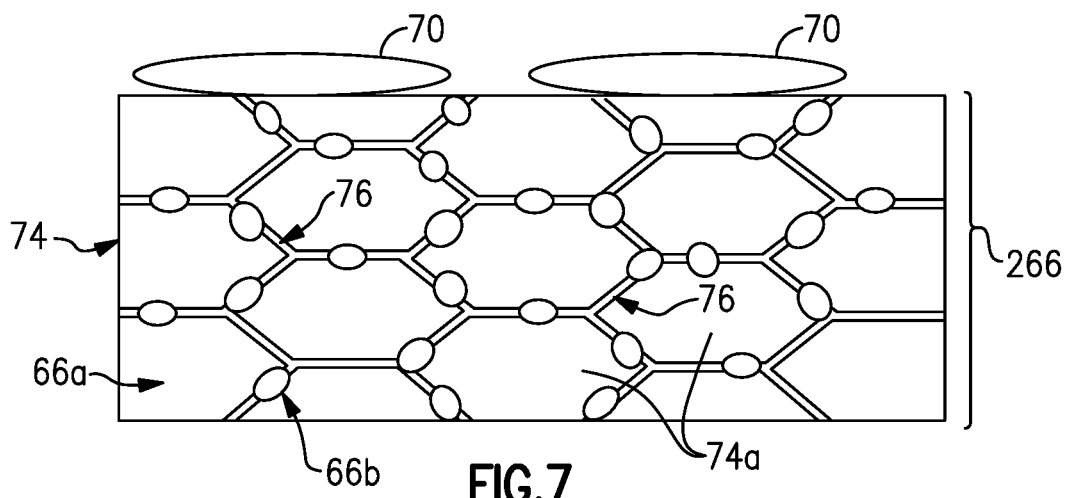
FIG. 7 illustrates an engineered microstructure of a silicate-resistant barrier coating.

FIG. 7 illustrates a representative portion of an example coating 266 produced in accordance with the method 72. The coating 266 has an engineered microstructure 74 that includes grains 74a that make up the refractory matrix 66a. The grains 74a border each other at grain boundaries 76, and the CAS additives 66b are dispersed in the grain boundaries 76 between the grains 74a. A grain 74a may be a singular grain with a definitive boundary or a region of multiple grains (i.e., sub-grains) with a definitive perimeter boundary delimited by the boundaries of the sub-grains. For instance, a grain 74a may be produced from a "splat" or region of multiple "splats" of molten or partially molten material deposited during thermal spray.

As used herein the term "engineered" refers to a deliberate or manipulated arrangement of structures relative to each other, as opposed to a random arrangement of the structures. For an engineered granule, the structures are compositional regions that are in a deliberate or manipulated arrangement relative to each other. For an engineered microstructure, the structures are compositional regions, grains, phases, and/or constituents that are in a deliberate or manipulated arrangement relative to each other. Here, the engineered microstructure 74 results from the engineered granules, i.e., the granules are structured to control the microstructure.

The engineered microstructure 74 facilitates resistance to infiltration of the deposits 70. Deposits may wick into a coating via grain boundaries or porosity in the coating. In a thermal spray process, when using blends of conventional, loose feedstock particles of different compositions, the particles (particularly relatively small particles in relatively small amounts) can agglomerate or segregate. This is especially true for blends of particles of differing sizes, shapes, and densities. The agglomerates or segregated particles prevent a good dispersing and, as a result, the different compositions of the particles are not well dispersed in the final coating. In particular, this may debit performance of a silicate-resistant barrier coating, wherein additive particles that may be intended to hinder infiltration though grain boundaries end up as relatively large isolated agglomerate regions in the coating, leaving the grain boundaries substantially open for infiltration by the deposits. In contrast, through use of engineered granules to produce the engineered microstructure 74, the CAS additive 66b is well-dispersed through the grain boundaries 76, thereby enhancing the blocking effect of the CAS additive 66b.

The engineered granules used in the method 72 may be of one or more different configuration types, each of which is an aggregate of at least one refractory matrix region and at least one CAS additive region attached with the at least one refractory matrix region. The aforementioned regions may be particles of either the refractory matrix material or the CAS additive material, coatings of either the refractory matrix material or the CAS additive material, or regions that are produced from films, suspensions, or the like.

Figure 8:
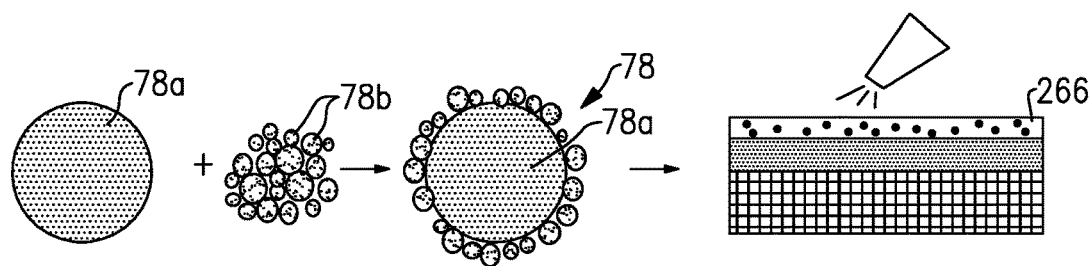
FIG. 8 illustrates a core/shell granule for the method.

FIG. 8 illustrates an example first type of engineered granule 78, which is a core/shell granule. The core/shell granule 78 in this example is formed from a coarse core particle 78a that is a refractory matrix particle. A refractory matrix particle is a particle that is composed of one or more constituents that will make up the refractory matrix 66a. There are a plurality of fine shell particles 78b attached on the coarse core particle 78a. The fine shell particles 78b are CAS additive particles. A CAS additive particle is a particle that is composed of one or more constituents that will make up the CAS additive 66b, although most typically the CAS additive particle will be composed of all of the constituents of the CAS additive 66b.

The coarse core particle 78a is generally substantially larger in particle size than the fine shell particle 78b so that the coarse core particle 78a can serve as a support for many of the fine shell particles 78b. As an example, the coarse core particle 78a has a particle size of greater than 10 micrometers, and the shell particle 78b has a size of less than 5 micrometers, such as 1-2 micrometers. In further examples, the coarse core particle 78a has a maximum particle size of no greater than 150 micrometers and minimum particle size of no less than 45 micrometers. In another embodiment, the coarse core particle 78a has a particle size of 15 micrometers to 45 micrometers. A useful size range may also be described by mesh sizes, in which coarse core particles 78a have a size of −100 mesh/+325 mesh. The resulting core/shell granule 78 thus has a granule size that is somewhat larger than the particle size of the coarse core particle 78a. Such a granule size may facilitate the thermal spray process, as sizes under 10 micrometers, such as under 5 micrometers, tend to challenge the flow of starting materials in the thermal spray process. Particle size may be measured using ASTM B822: Standard Test Method for Particle Size Distribution of Metal Powders and Related Compounds by Light Scattering.

The fine shell particles 78b are attached on the outer surface of the coarse core particle 78a. During thermal processing, such as thermal spraying, the attachment of the fine shell particles 78b on the coarse core particle 78a limits the fine shell particles 78b from agglomerating and segregating to thereby maintain the dispersion of the fine shell particles 78b. As a result, the fine shell particles 78b remain dispersed between the coarse core particles 78a as they are deposited into the substrate 62 such that in the consolidated state the CAS additive 66b formed by the fine shell particles 78b resides in the grain boundaries 76 between the grains 74a formed by the coarse core particles 78b in the engineered microstructure 74.

The core/shell granules 78 can be provided for the method 72 as pre-fabricated core/shell granules 78. Alternatively, the core/shell granules 78 can be provided for the method 72 by preparing the core/shell granules 78 from starting powders of the coarse core particles 78a and fine shell particles 78b. For example, the fine shell particles 78b can be attached on the coarse core particles 78a using a granulating technique such as mechanical mixing, acoustic mixing, spray drying or wet chemical or vapor deposition techniques. As shown, the granules 78 may then be used in a thermal spray to deposit the coating 266, which corresponds to step 72b of the method 72.

The following are non-limiting examples that can be used to attach the fine shell particles 78b on the coarse core particles 78a. Acoustic mixing techniques may be utilized whereby dry blends of coarse particles 78a and fine shell particles 78b are provided in a suitable container and placed in an acoustic mixer. The mixer is operated at a frequency of 60 Hz, generating a mixing force of up to 100 times the gravitation force (e.g. 100 g's), with mixing times typically on the order of a few minutes. The fine shell particles 78b are bound to the coarse particles 78a via electrostatic forces. Small amounts of liquid, including an organic or inorganic binder, may optionally be used to further facilitate bonding of the fine shell particles 78b to the coarse particles 78a.

Figure 9:
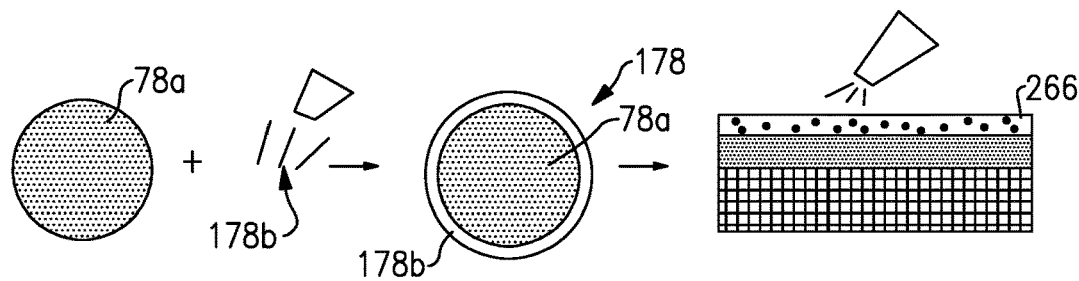
FIG. 9 illustrates another example of a core/shell granule having a shell coating.

FIG. 9 illustrates a variation of a core/shell granule 178 that is somewhat similar to the granule 78. In this example, rather than the fine shell particles 78b (or alternatively in addition to the fine shell particles 78b), the shell is provided by a shell coating 178b. The shell coating 178b may be applied or deposited onto the coarse core particle 78a by vapor deposition and results in a continuous solid shell surrounding the coarse core particle 78a. The techniques for applying the shell coating 178b onto the coarse core particles 78a are not particularly limited, but may include fluidized bed chemical vapor deposition or atomic layer deposition. Additionally, the shell coating 178b may be composed of all of the constituents of the CAS additive 66b. However, in alternative examples, the shell coating 178b may be multi-layered and include individual layers of one or more of the constituents of the CAS additive 66b, such as a layer of CaO, a layer of $Al_2O_3$, a layer $SiO_2$, or layers of combinations of two of these constituents mixed together.

Figure 10:
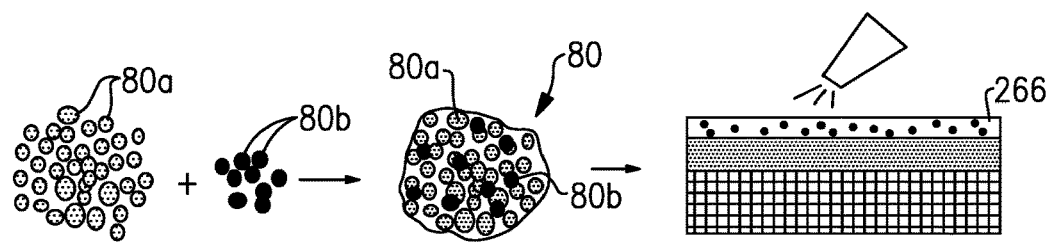
FIG. 10 illustrates a mixed granule for the method.

FIG. 10 illustrates an example second type of engineered granule 80, which is a mixed granule. As shown, the mixed granule 80 is formed from a plurality of refractory matrix particles 80a and a plurality of CAS additive particles 80b attached with the refractory matrix particles 80a. The CAS additive particles 80b may be composed of one or more constituents that will make up the CAS additive 66b. For instance, a single CAS additive particle 80b may contain all of the constituents that will make up the CAS additive 66b. In another example, the CAS additive particles 80b are individual constituents of the CAS additive 66b. For instance, one CAS additive particle 80b is CaO and another CAS additive particle is $SiO_2$. In further examples, the individual constituents may be in the form of nitrates and carbonates of calcium, aluminum, and/or silica. As an example, the refractory matrix particles 80a and the CAS additive particles 80b are substantially similar in size, to facilitate good mixing and inter-dispersion. For instance, the refractory matrix particles 80a and the CAS additive particles 80b are both less than 10 micrometers, such as less than 5 micrometers or in the range of 0.5-5 micrometers.

The refractory matrix particles 80a and the CAS additive particles 80b are attached together in the granules 80. During thermal processing, such as thermal spraying, the attachment between the refractory matrix particles 80a and the CAS additive particles 80b limits the CAS additive particles 80b from agglomerating or segregating to thereby maintain the dispersion of the CAS additive particles 80b. As a result, the CAS additive particles 80b remain dispersed among or local to the refractory matrix particles 80a as they are deposited into the substrate 62 such that in the consolidated state the CAS additive 66b formed by the CAS additive particles 80b resides in the grain boundaries 76 between the grains 74a formed by the refractory matrix particles 80a in the engineered microstructure 74.

Like the core/shell granules 78, the mixed granules 80 can be pre-fabricated for the method 72 or prepared from starting powders. For example, the mixed granules 80 can be prepared using a spray drying technique in which starting powders of the refractory matrix particles 80a and the CAS additive particles 80b are mixed in a slurry with a carrier fluid and then spray dried. Optionally, the spray drying may be followed by a sintering step to further consolidate the granules 80 prior to the thermal consolidation at step 72b of the method 72.

The following is a non-limiting example that can be used to attach the refractory matrix particles 80a and the CAS additive particles 80b to form the granules 80. The refractory matrix particles 80a and CAS additive particles 80b may be formulated in an aqueous or non-aqueous slurry containing on the order of 10 to 50 vol % of the granules 80. The slurry may contain an organic binder, inorganic binder, dispersants or other modifiers such as plasticizers to facilitate the appropriate slurry viscosity for formation of the granules 80. The slurry is atomized in a spray drier using, for example, a pressure or rotary atomizer, with atomization pressures and rotation speeds selected to achieve the desired granule size distribution. Slurry feed rates and spray drying temperatures also influence granule formation, with typical gas inlet temperatures being between about 200-400° C. and outlet temperatures less than 160° C. The various size fractions of granules 80 may be collected in a chamber or cyclone collection unit, with the coarser granules 80 collected in the former and finer granules 80 collected in the latter.

The refractory matrix particles 80a and the CAS additive particles 80b can also be attached to form the granules 80 using a colloidal dispersion or solution technique. For example, colloidal silica, solutions of calcium nitrate and aluminum nitrates, or any metal nitrate solutions that contain the same metal as the refractory matrix may be used. Examples include, but are not limited to, hafnium nitrate, zirconium nitrate, rare earth metal nitrates, or combination thereof.

Figure 11:
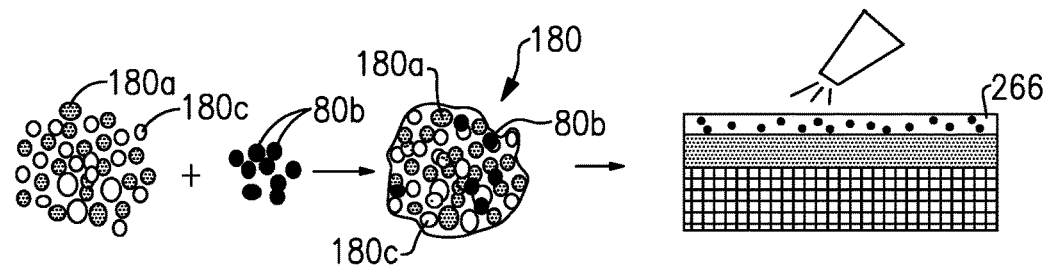
FIG. 11 illustrates another example of a mixed granule with auxiliary refractory matrix particles.

FIG. 11 illustrates another example second type of engineered granule 180. In this example, the mixed granule 180 is formed from a plurality of refractory matrix particles 180a, a plurality of auxiliary refractory matrix particles 180c, and the plurality of CAS additive particles 80b attached with the particles 180a/180c. The refractory matrix particles 180a are composed of one or more constituents of the refractory matrix 66a and the auxiliary refractory matrix particles 180c are composed or one or more constituents of the refractory matrix 66a that differ in composition from those in the particles 180a. For example, the particles 180a are composed of $HfO_2$ and the particles 180c are composed of $SiO_2$. It is to be understood that the compositions of the particles 180a/180c may be selected from any of the constituents disclosed herein, such as zirconia ($ZrO_2$), hafnia ($HfO_2$), hafnium silicate, zirconium silicate, rare earth silicates, rare earth oxides, mullite, silica ($SiO_2$), aluminum oxide, or combinations thereof.

Figure 12:
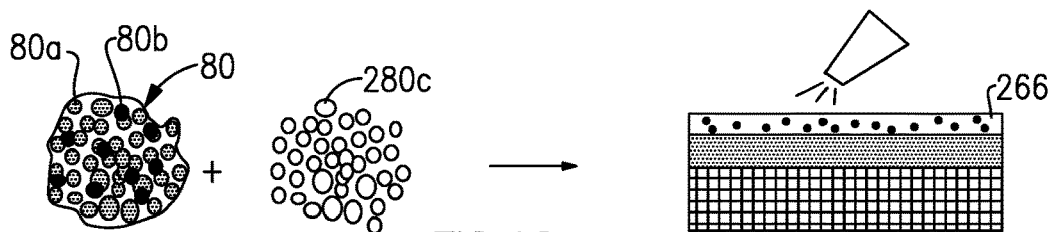
FIG. 12 illustrates a variation with a granule and separate auxiliary refractory matrix particles.

FIG. 12 demonstrates a variation that can be used in the thermal spray process. In the prior examples, the granules may contain all of the constituents of the coating 266. In the illustrated example, however, at least one constituent of the refractory matrix 66a is excluded from the granule 80. The excluded constituent is provided as separate, loose auxiliary refractory matrix particles 280c. The granules 80 and the auxiliary refractory matrix particles 280c are then co-sprayed in the thermal spray process, such as by premixing the granules 80 and the auxiliary refractory matrix particles 280c or by mixing the granules 80 and the auxiliary refractory matrix particles 280c in the thermal spray stream. The composition of the auxiliary refractory matrix particles 280c may be one or more of the constituents of the refractory matrix 66a, such as zirconia ($ZrO_2$), hafnia ($HfO_2$), hafnium silicate, zirconium silicate, rare earth silicates, rare earth oxides, mullite, silica ($SiO_2$), aluminum oxide, or combinations thereof.

The use of the separate auxiliary refractory matrix particles 280c may also permit an additional parameter of control in forming the coating 266. For instance, the amount of the granules 80 and/or amount of the auxiliary refractory matrix particles 280c provided during the thermal spraying may be adjusted in order to adjust the relative amounts of the constituents that are deposited. By adjusting the amounts during thermal spraying, a graded composition of the coating 266 is produced. Further, additional auxiliary refractory matrix particles of one or more other constituents can be used to provide graded compositions of multiple constituents. Thus, the amounts of the zirconia ($ZrO_2$), hafnia ($HfO_2$), hafnium silicate, zirconium silicate, rare earth silicates, rare earth oxides, mullite, silica ($SiO_2$), aluminum oxide, or combinations thereof may be varied in the coating 266 to provide a gradual grading in the through-thickness or along the plane of the coating 266.

Figure 13:
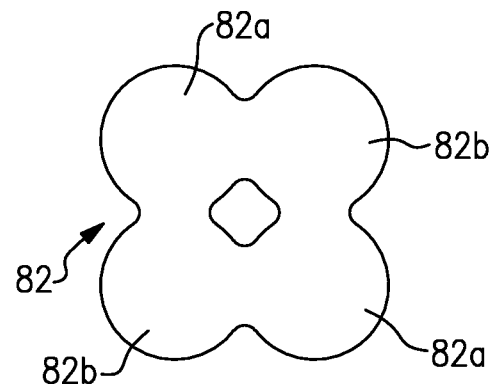
FIG. 13 illustrates a sintered attachment between particles.

The nature of the attachment between particles in the afore-described granules can also be varied and manipulated. For example, the attachment may be by sintering, by electrostatic force, or by a binder. FIG. 13 illustrates a sintered attachment 82 between particles 82a/82b, which may be any of the afore-mentioned particles. In the sintered attachment 82, the particles 82a/82b coalesce and densify, thereby intimately bonding the particles 82a/82b together. As an example, after forming granules, the granules may be heated to a sintering temperature in air, vacuum, or an inert atmosphere that is substantially non-reactive with the particles 82a/82b, wherein the particles 82a/82b diffuse and coalesce.

Figure 14:
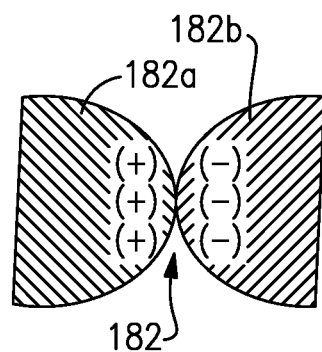
FIG. 14 illustrates an electrostatic attachment between particles.

FIG. 14 illustrates an electrostatic attachment 182 between particles 182a/182b, which may be any of the aforementioned particles.

Figure 15:
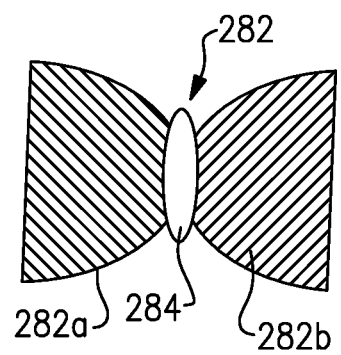
FIG. 15 illustrates a binder attachment between particles.

FIG. 15 illustrates a binder attachment 282 between particles 282a/282b, which may be any of the afore-mentioned particles. The binder attachment 282 includes a binder 284 that bonds or adheres to the particles 282a/282b together. For example, the binder 284 is an organic binder that eventually burns off, such as during thermal spraying. Additionally or alternatively, the binder 284 is inorganic, such as colloidal silica. In this case, rather than burning off, the binder may incorporate into the coating 266. For example, an inorganic binder is selected to be compatible with one or more constituents of the coating 266. For instance, for a coating 266 that includes silica, the colloidal silica is compatible because it incorporates with the silica already present in the coating 266. The binder 284 may include other types of oxides or other inorganic compounds such as nitrates, phosphates, or carbonates of calcium, aluminum, hafniun, zirconium, rare earth metals. If a carbonate, the carbonate would decompose to oxides under the high temperatures during thermal spraying.

The examples disclosed herein may be used to tailor the performance of the silicate-resistant barrier coatings. For instance, there are a range of compositions disclosed that may be used to tailor the composition of the silicate-resistant barrier coating to achieve a desired performance goal for silicate-resistance, as well as other goals, such as thermal expansion. As also discussed, the range of compositions may also be used to tailor the silicate-resistant barrier coating to be equilibrated with a target deposit composition. And finally, the exemplary methods of fabricating the silicate-resistant barrier coating may be used to further enhance silicate-resistance via the engineered microstructure. The examples thus enable newfound flexibility in designing the silicate-resistant barrier coating to meet specific challenges.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
   a substrate; and
   a silicate-resistant barrier coating disposed on the substrate, the silicate-resistant barrier coating being composed of a refractory matrix and a calcium aluminosilicate additive (CAS additive) dispersed in the refractory matrix, the refractory matrix being selected from hafnia, hafnium silicate, zirconium silicate, or combinations thereof, and the silicate resistant barrier coating including, by mol. %, 0.1 to 30 of the CAS additive and a remainder being the refractory matrix.

2. The article as recited in claim 1, wherein the CAS additive includes, by mol. %, 30 to 90 of $SiO_2$.

3. The article as recited in claim 1, wherein the CAS additive includes, by mol. %, 5 to 30 of $AlO_{1.5}$.

4. The article as recited in claim 1, wherein the CAS additive includes, by mol. %, 10 to 50 of CaO.

5. The article as recited in claim 1, wherein the CAS additive includes, by mol. %, 30 to 90 of $SiO_2$, 5 to 30 of $AlO_{1.5}$, and 10 to 50 of CaO.

6. The article as recited in claim 1, wherein the CAS additive includes $X^1$ mol. % of $SiO_2$, $X^2$ mol. % of CaO, and $X^3$ mol. % of $AlO_{1.5}$, where $X^1$ is greater than $X^2$ and $X^1$ is greater than $X^3$.

7. The article as recited in claim 6, wherein the CAS additive includes, by mol. %, less than 10 of at least one of magnesium, barium, or strontium in the form of an oxide.

8. The article as recited in claim 1, wherein the refractory matrix is hafnia.

9. The article as recited in claim 1, wherein the silicate resistant barrier coating includes, by mol. %, 3 to 8 of the CAS additive.

10. The article as recited in claim 1, wherein the refractory matrix is hafnium silicate.

11. The article as recited in claim 1, wherein the refractory matrix is zirconium silicate.

12. The article as recited in claim 1, wherein the CAS additive is in grain boundaries of the refractory matrix.

13. The article as recited in claim 1, wherein the silicate-resistant barrier coating has a graded composition of the refractory matrix in a through-thickness direction.

* * * * *